US012402178B2

(12) United States Patent
Sarathchandra et al.

(10) Patent No.: US 12,402,178 B2
(45) Date of Patent: Aug. 26, 2025

(54) HANDLING CONNECTION REJECTIONS VIA U2U RELAY ASSOCIATED WITH BACKOFF TIMES ON BEHALF OF A SOURCE END WTRU

(71) Applicant: InterDigital Patent Holdings, Inc., Wilmington, DE (US)

(72) Inventors: Magurawalage Chathura Madhusanka Sarathchandra, London (GB); Michelle Perras, Montreal (CA); Samir Ferdi, Kirkland (CA); Taimoor Abbas, Sainte-Julie (CA); Jung Je Son, Warrington, PA (US); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/781,643

(22) Filed: Jul. 23, 2024

(65) Prior Publication Data
US 2025/0126657 A1    Apr. 17, 2025

Related U.S. Application Data

(63) Continuation of application No. PCT/US2024/022958, filed on Apr. 4, 2024.
(Continued)

(51) Int. Cl.
*H04W 74/0833* (2024.01)
*H04W 76/18* (2018.01)
*H04W 76/20* (2018.01)

(52) U.S. Cl.
CPC ......... *H04W 74/085* (2013.01); *H04W 76/18* (2018.02); *H04W 76/20* (2018.02)

(58) Field of Classification Search
CPC ...... H04W 74/08; H04W 76/02; H04W 76/01
See application file for complete search history.

(56) References Cited

U.S. PATENT DOCUMENTS

2020/0092784 A1* 3/2020 Hampel ............... H04W 76/27
2021/0051758 A1* 2/2021 Xu ....................... H04W 88/04
(Continued)

FOREIGN PATENT DOCUMENTS

WO   2021/237058 A1    11/2021
WO   2023/014777 A1    2/2023
WO   WO-2023014582 A1 *  2/2023    ........ H04W 36/0079

OTHER PUBLICATIONS

3rd Generation Partnership Project (3GPP), 3GPP TS 24.554 V1.2.0, "Proximity-services (ProSe) in 5G System (5GS) protocol aspects; Stage 3 (Release 17)", 3rd Generation Partnership Project; Technical Specification Group Core Network and Terminals, Feb. 2022, 271 pages.
(Continued)

*Primary Examiner* — Kashif Siddiqui
(74) *Attorney, Agent, or Firm* — Condo Roccia Koptiw LLP

(57) ABSTRACT

Systems and methods are described herein for handling connection rejects via a wireless transmit/receive unit (WTRU)-to-WTRU (U2U) relay associated with backoff times on behalf of a source end WTRU. A relay WTRU may retry to establish connection with a target WTRU on behalf of a source WTRU, for example, based on receiving a rejection (e.g., with a backoff value) from the target WTRU. The source WTRU may associate the reject message to the target WTRU, and the relay WTRU may be available to reach other target WTRUs. The relay WTRU may send a reject message to other source WTRUs (e.g., if the back off duration is active, running) for the same target WTRU.

10 Claims, 9 Drawing Sheets

Related U.S. Application Data

(60) Provisional application No. 63/457,616, filed on Apr. 6, 2023.

(56) References Cited

U.S. PATENT DOCUMENTS

| | | | | |
|---|---|---|---|---|
| 2021/0250749 | A1* | 8/2021 | Cheng | H04W 8/005 |
| 2022/0141898 | A1* | 5/2022 | Kim | H04W 76/14 |
| | | | | 370/315 |
| 2022/0361267 | A1* | 11/2022 | Wang | H04W 76/14 |
| 2022/0369215 | A1* | 11/2022 | Dees | H04W 76/14 |
| 2022/0386178 | A1* | 12/2022 | Park | H04W 76/11 |
| 2023/0007710 | A1* | 1/2023 | Tenny | H04W 12/106 |
| 2023/0139318 | A1* | 5/2023 | Zhang | H04W 28/0236 |
| | | | | 370/329 |

OTHER PUBLICATIONS

3rd Generation Partnership Project (3GPP), C1-226116, "Correction on cause value #14", Qualcomm Incorporated, CT1, 3GPP TSG-CT WG1 Meeting #138-e, E-Meeting, Oct. 10-14, 2022, 5 pages.

3rd Generation Partnership Project (3GPP), C1-230891, "Relay update procedure for link identifier update via 5G ProSe UE-to-UE relay UE", InterDigital Inc., C1, 3GPP TSG-CT WG1 Meeting #140, Athens, Greece, Feb. 27-Mar. 3, 2023, 7 pages.

3rd Generation Partnership Project (3GPP), C1-231213, "Using the 5G ProSe direct link establishment procedure for UE-to-UE relay—Rejection scenarios", Nokia, Nokia Shanghai Bell, C1, 3GPP TSG-CT WG1 Meeting #140, Athens, Greece, Feb. 27-Mar. 3, 2023, 7 pages.

3rd Generation Partnership Project (3GPP), C1-233375, "Link Establishment not accepted when using U2U relay", 3GPP TSG-CT WG1 Meeting #142; InterDigital; Bratislava, May 22-26, 2023, 6 pages.

3rd Generation Partnership Project (3GPP), TS 23.304 V17.3.0, "Technical Specification Group Services and System Aspects, Proximity based Services (ProSe) in the 5G System (5GS) (Release 17)", Jun. 2022, pp. 1-105.

3rd Generation Partnership Project (3GPP), TS 24.554 V17.3.0, "Technical Specification Group Core Network and Terminals, Proximity-services (ProSe) in 5G System (5GS) protocol aspects, Stage 3 (Release 17)", Dec. 2022, pp. 1-371.

* cited by examiner

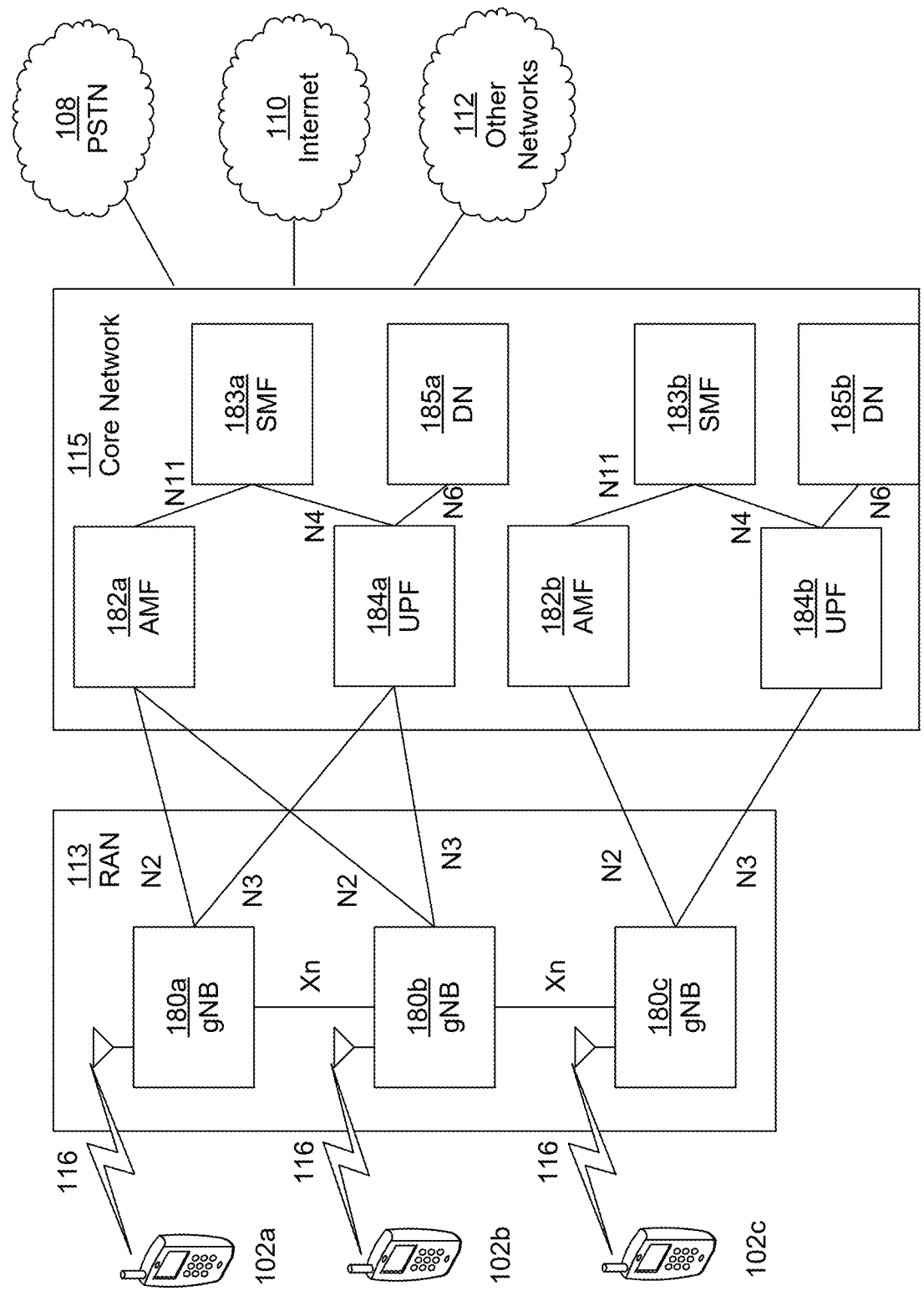

HANDLING CONNECTION REJECTIONS VIA U2U RELAY ASSOCIATED WITH BACKOFF TIMES ON BEHALF OF A SOURCE END WTRU

CROSS-REFERENCE TO RELATED APPLICATIONS

The application filed under 35 U.S.C. § 111 is a continuation of and claims the benefit, under 35 U.S.C. § 365, of Patent Cooperation Treaty Application No. PCT/US2024/022958, filed Apr. 4, 2024, which claims the benefit of U.S. Provisional Application 63/457,616, filed Apr. 6, 2023, the contents of which are incorporated by reference in their entirety herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems and methods are described herein for handling connection rejects via a wireless transmit/receive unit (WTRU)-to-WTRU (U2U) relay associated with backoff times on behalf of a source end WTRU. A relay WTRU may retry to establish connection with a target WTRU on behalf of a source WTRU, for example, based on receiving a rejection (e.g., with a backoff value) from the target WTRU. The source WTRU may associate the reject message to the target WTRU, and the relay WTRU may be available to reach other target WTRUs. The relay WTRU may send a reject message to other source WTRUs (e.g., if the back off duration is active, running) for the same target WTRU.

A relay WTRU may retry connection establishment with a target WTRU on behalf of a source WTRU. For example, the relay WTRU may receive a first rejection message from the target WTRU. The first rejection message may be associated with a first direct communication request (DCR) transmission or a first link modification request (LMR) transmission. The first rejection message may indicate congestion. The first rejection message may indicate a rejection cause value. The first rejection message may indicate a back off value. The first DCR or first LMR may be associated with the source WTRU. The relay WTRU may determine a number of retransmissions associated with the source WTRU (e.g., number of retransmissions associated with the request to establish connection). The WTRU may send a second rejection message to the source WTRU. The second rejection message may be sent based on whether the number of retransmissions associated with the source WTRU is below a threshold (e.g., maximum number of allowed retransmissions). The second rejection message to the source WTRU may indicate whether the relay WTRU will (e.g., attempt to) make one or more retransmission attempts on behalf of the source WTRU. The second rejection message may indicate the number of retransmission attempts.

For example, if the number of retransmission attempts associated with the source WTRU is below the threshold, the relay WTRU will perform one or more of the following. The relay WTRU may track a duration associated with a back off value (e.g., indicated by the first rejection message). The relay WTRU may include in the second rejection message to the source WTRU, and indication that the relay WTRU will (e.g., attempt to) make retransmission attempts on behalf of the source WTRU. The relay WTRU may send, to the target WTRU, a second DCR/LMR transmission (e.g., based on a determination that the back off value has elapsed) on behalf of the source WTRU. For example, if the number of retransmission attempts is greater than or equal to the threshold, the relay WTRU may determine to abort direct link establishment. The second rejection message may indicate identification information associated with the target WTRU. The second rejection message may indicate that a maximum number of retries has been reached.

A relay WTRU may send a rejection message to a source WTRU without attempting to establish connection with a target WTRU, for example, if the relay WTRU has already received a rejection for a different source WTRU with the target WTRU. The WTRU may receive a first message from a target WTRU. The first message may indicate a rejection associated with a first request to establish a first connection between a first source WTRU and the target WTRU. The first message may indicate a back off value associated with the target WTRU. The relay WTRU may receive a second message from a second source WTRU. The second message may be associated with a second request to establish a second connection between the second source WTRU and the target WTRU using the relay WTRU. The relay WTRU may send a third message to the second source WTRU indicating that the target WTRU has rejected the first request to establish the first connection between the first source WTRU and the target WTRU. The third message may indicate a cause value (e.g., that indicates that the target WTRU has previously rejected the request to establish the first connection between the first source WTRU and the target WTRU). The relay WTRU may send the third message, for example, without attempting to make the establishment with the target WTRU (e.g., because the relay WTRU already received a rejection for the first source WTRU and the target WTRU). The relay WTRU may determine that a duration associated with the back off value has expired. The WTRU may (e.g., based on the determination that the duration associated with the back off value has expired) send a fourth message to the target WTRU. The fourth message may be associated with one or more of the first request to establish the first connection between the first source WTRU and the target WTRU or the second request to establish the second connection between the second source WTRU and the target WTRU. The fourth message may be sent, for example, based on a determination that a number of retransmissions associated with the connection establishment with the target WTRU is below a threshold. The relay WTRU may determine the number of retransmissions. The relay WTRU may receive a fifth message from the target WTRU that indicates that the second request to establish the second connection between the second source WTRU and the target WTRU is rejected. The relay WTRU may determine (e.g., based on the fifth message) that a number of retransmissions associated with connection establishment with the target WTRU is equal to or greater than a threshold. The relay WTRU may (e.g., based on the determination that the number of retransmissions associated with connection establishment with the target WTRU is equal to or greater than the threshold) send a reject message to the second source WTRU associated with a pending link establishment connection request.

The WTRU may send a connection establishment request to the target WTRU. The connection establishment request may be a DCR or an LMR. A WTRU may receive a back-off value associated with a connection establishment rejection associated with a target WTRU. The back off value associated with the connection establishment rejection may be received in response to the sent connection establishment request. The WTRU may receive a first message that indicates that the WTRU is to retry connection establishment with the target WTRU. The first message may indicate a value associated with a waiting period duration. The WTRU may track a duration associated with the back off value. The tracking of the duration may be initiated based on a reception of a third message from the target WTRU. The tracking of the duration may be initiated based on a determination that the waiting period duration has expired. The WTRU may determine to retry connection establishment with the target WTRU. The determination to retry connection establishment with the target WTRU may be based on receiving a third message from the target WTRU indicating to retry connection establishment. The determination to retry connection establishment with the target WTRU may be based on a determination that the duration associated with the back off value has expired. In examples, the WTRU may be a relay WTRU. For a relay WTRU, the connection establishment rejection may be associated with a first source WTRU. The relay WTRU may (e.g., based on reception of the reject message) send a message to the source WTRU that indicates the target WTRU has requested to wait. The relay WTRU may attempt to establish connection between the source WTRU and the target WTRU.

BRIEF DESCRIPTION OF THE DRAWINGS

FIG. 1D is a system diagram illustrating a further example RAN and a further example CN that may be used within the communications system illustrated in FIG. 1A according to an embodiment.

DETAILED DESCRIPTION

Figure 1A:
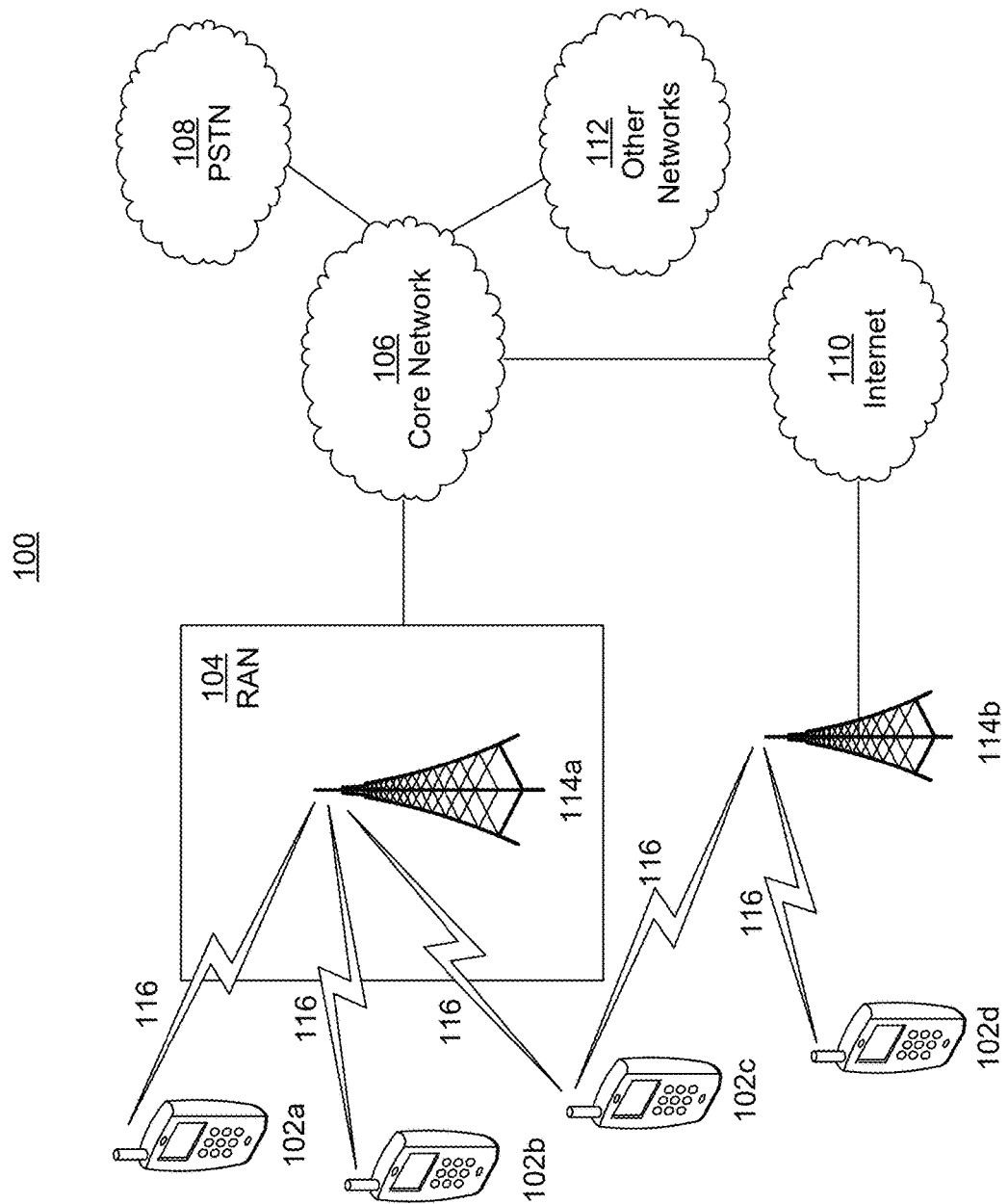
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
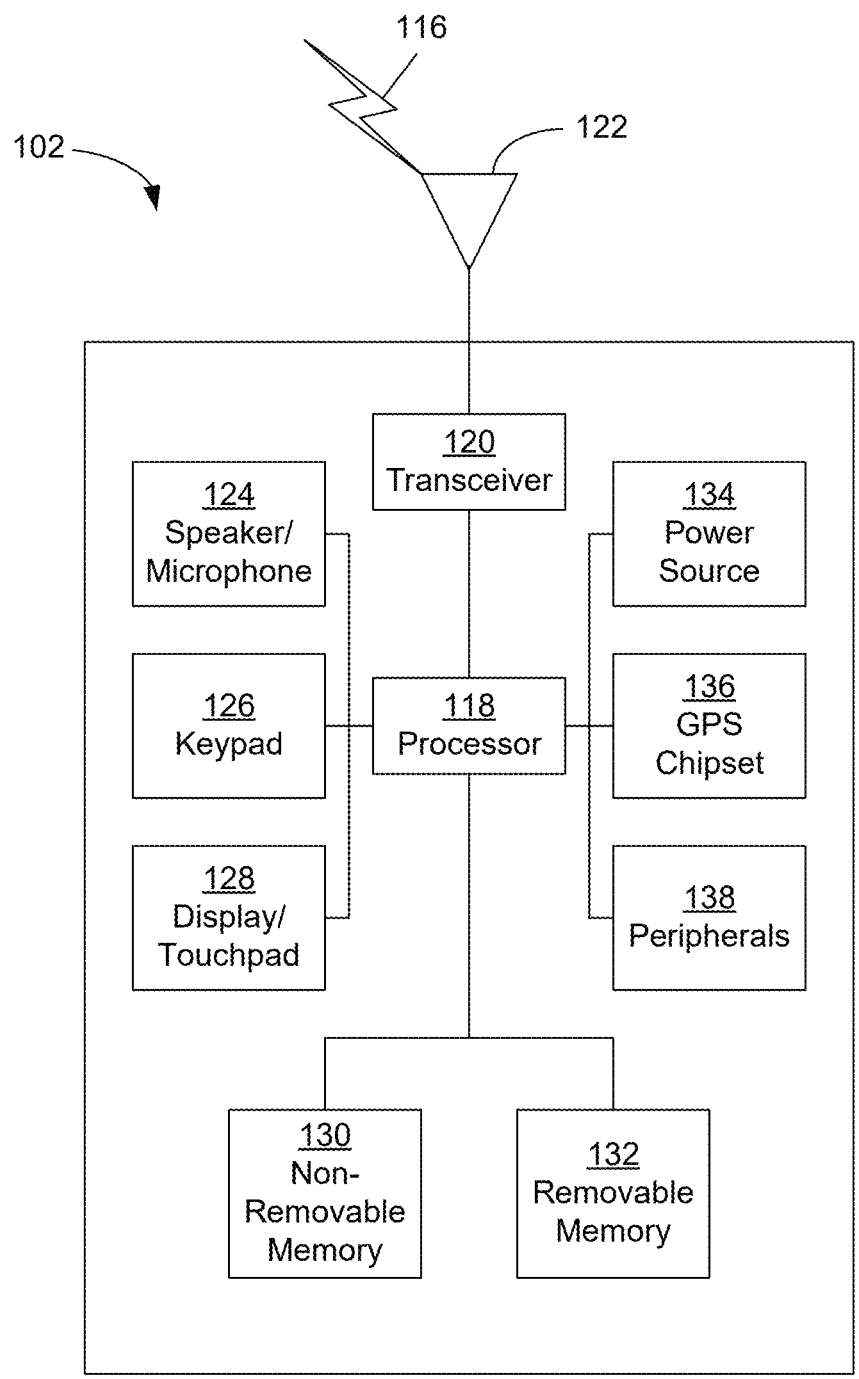
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
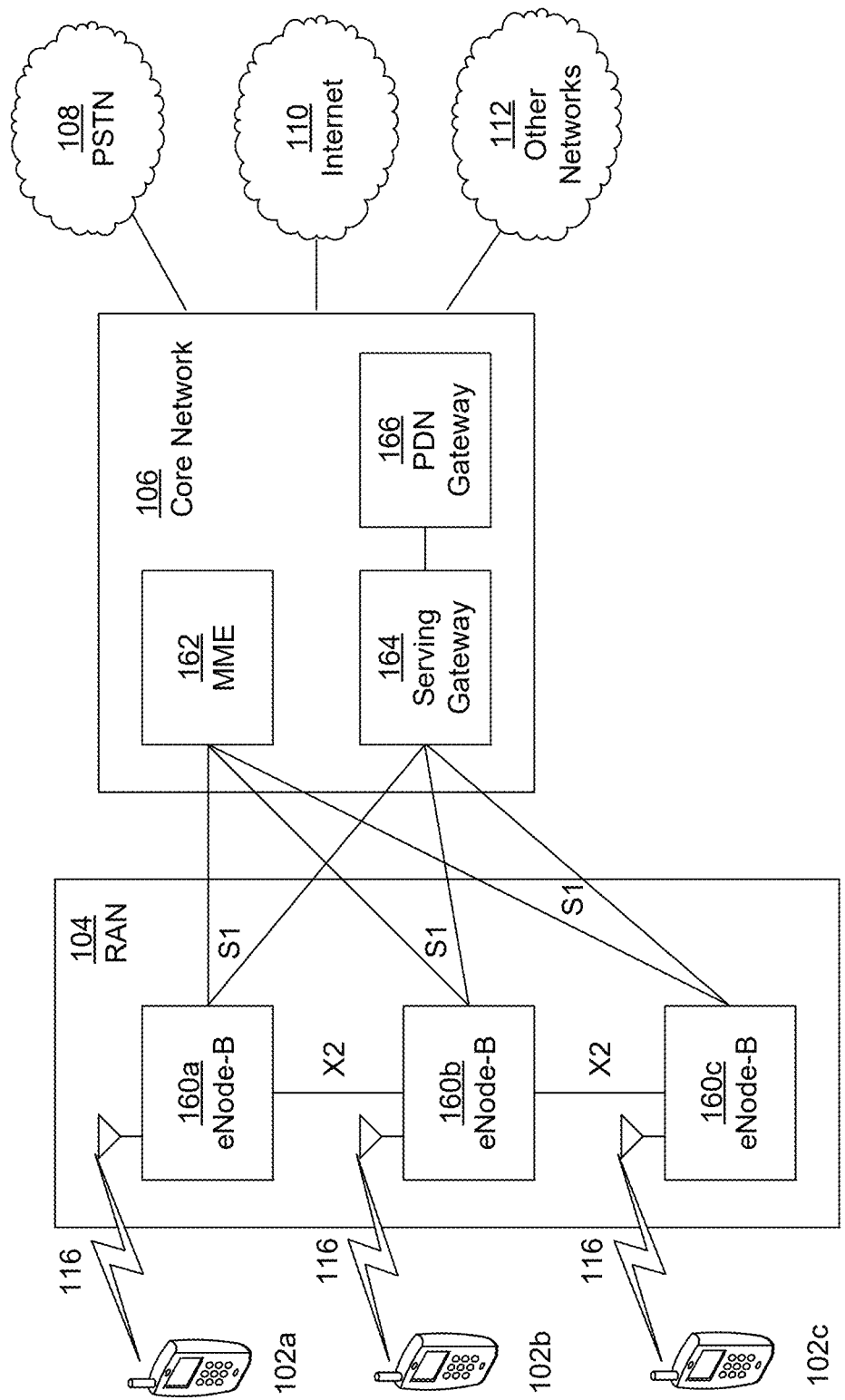
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHz, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems and methods are described herein for handling connection rejects via a wireless transmit/receive unit (WTRU)-to-WTRU (U2U) relay associated with backoff times on behalf of a source end WTRU. A relay WTRU may retry to establish connection with a target WTRU on behalf of a source WTRU, for example, based on receiving a rejection (e.g., with a backoff value) from the target WTRU. The source WTRU may associate the reject message to the target WTRU, and the relay WTRU may be available to reach other target WTRUs. The relay WTRU may send a reject message to other source WTRUs (e.g., if the back off duration is active, running) for the same target WTRU.

A relay WTRU may retry connection establishment with a target WTRU on behalf of a source WTRU. For example, the relay WTRU may receive a first rejection message from the target WTRU. The first rejection message may be associated with a first direct communication request (DCR) transmission or a first link modification request (LMR) transmission. The first rejection message may indicate congestion. The first rejection message may indicate a rejection cause value. The first rejection message may indicate a back off value. The first DCR or first LMR may be associated with the source WTRU. The relay WTRU may determine a number of retransmissions associated with the source WTRU (e.g., number of retransmissions associated with the request to establish connection). The WTRU may send a second rejection message to the source WTRU. The second rejection message may be sent based on whether the number of retransmissions associated with the source WTRU is below a threshold (e.g., maximum number of allowed retransmissions). The second rejection message to the source WTRU may indicate whether the relay WTRU will (e.g., attempt to) make one or more retransmission attempts on behalf of the source WTRU. The second rejection message may indicate the number of retransmission attempts.

For example, if the number of retransmission attempts associated with the source WTRU is below the threshold, the relay WTRU will perform one or more of the following. The relay WTRU may track a duration associated with a back off value (e.g., indicated by the first rejection message). The relay WTRU may include in the second rejection message to the source WTRU, and indication that the relay WTRU will (e.g., attempt to) make retransmission attempts on behalf of the source WTRU. The relay WTRU may send, to the target WTRU, a second DCR/LMR transmission (e.g., based on a determination that the back off value has elapsed) on behalf of the source WTRU. For example, if the number of retransmission attempts is greater than or equal to the threshold, the relay WTRU may determine to abort direct link establishment. The second rejection message may indicate identification information associated with the target WTRU. The second rejection message may indicate that a maximum number of retries has been reached.

A relay WTRU may send a rejection message to a source WTRU without attempting to establish connection with a target WTRU, for example, if the relay WTRU has already received a rejection for a different source WTRU with the target WTRU. The WTRU may receive a first message from a target WTRU. The first message may indicate a rejection associated with a first request to establish a first connection between a first source WTRU and the target WTRU. The first message may indicate a back off value associated with the target WTRU. The relay WTRU may receive a second message from a second source WTRU. The second message may be associated with a second request to establish a second connection between the second source WTRU and the target WTRU using the relay WTRU. The relay WTRU may send a third message to the second source WTRU indicating that the target WTRU has rejected the first request to establish the first connection between the first source WTRU and the target WTRU. The third message may indicate a cause value (e.g., that indicates that the target WTRU has previously rejected the request to establish the first connection between the first source WTRU and the target WTRU). The relay WTRU may send the third message, for example, without attempting to make the establishment with the target WTRU (e.g., because the relay WTRU already received a rejection for the first source WTRU and the target WTRU). The relay WTRU may determine that a duration associated with the back off value has expired. The WTRU may (e.g., based on the determination that the duration associated with the back off value has expired) send a fourth message to the target WTRU. The fourth message may be associated with one or more of the first request to establish the first connection between the first source WTRU and the target WTRU or the second request to establish the second connection between the second source WTRU and the target WTRU. The fourth message may be sent, for example, based on a determination that a number of retransmissions associated with the connection establishment with the target WTRU is below a threshold. The relay WTRU may determine the number of retransmissions. The relay WTRU may receive a fifth message from the target WTRU that indicates that the second request to establish the second connection between the second source WTRU and the target WTRU is rejected. The relay WTRU may determine (e.g., based on the fifth message) that a number of retransmissions associated with connection establishment with the target WTRU is equal to or greater than a threshold. The relay WTRU may (e.g., based on the determination that the number of retransmissions associated with connection establishment with the target WTRU is equal to or greater than the threshold) send a reject message to the second source WTRU associated with a pending link establishment connection request.

The WTRU may send a connection establishment request to the target WTRU. The connection establishment request may be a DCR or an LMR. A WTRU may receive a back-off value associated with a connection establishment rejection associated with a target WTRU. The back off value associated with the connection establishment rejection may be received in response to the sent connection establishment request. The WTRU may receive a first message that indicates that the WTRU is to retry connection establishment with the target WTRU. The first message may indicate a value associated with a waiting period duration. The WTRU may track a duration associated with the back off value. The tracking of the duration may be initiated based on a reception of a third message from the target WTRU. The tracking of the duration may be initiated based on a determination that the waiting period duration has expired. The WTRU may determine to retry connection establishment with the target WTRU. The determination to retry connection establishment with the target WTRU may be based on receiving a third message from the target WTRU indicating to retry connection establishment. The determination to retry connection establishment with the target WTRU may be based on a determination that the duration associated with the back off value has expired. In examples, the WTRU may be a relay WTRU. For a relay WTRU, the connection establishment rejection may be associated with a first source WTRU. The relay WTRU may (e.g., based on reception of the reject message) send a message to the source WTRU that indicates the target WTRU has requested to wait. The relay WTRU may attempt to establish connection between the source WTRU and the target WTRU.

A relay (e.g., U2U relay) may retry, for example, if (e.g., when) it receives a reject message with a backoff time on behalf of the source end WTRU. The U2U relay may be provisioned with (e.g., receive configuration information indicating) an RSC. The RSC may indicate support for "managed peer connection failure handling." The U2U relay may receive a direct communication request (DCR) or link modification request (LMR) from a source WTRU to establish connectivity via the relay. The request may specify whether the U2U relay may handle a congestion condition retry procedure, for example, on behalf of the source WTRU (e.g., by including "managed failure by source WTRU" or "managed failure by relay"). The U2U relay may send a DCR or LMR to a target WTRU. The U2U relay may receive a DC reject or link modification reject message from the target WTRU, for example, with a code (e.g., #5 or #13) and a backoff time. The U2U relay may send a message to the source WTRU, for example, indicating that it may be waiting for the backoff interval and performing a number of retries on behalf of the source WTRU. For example, the U2U relay may send a DCReject/LMReject to the source end WTRU. The DCReject/LMReject may include a code (e.g., new code) that may indicate the cause "Congestion Situation at target WTRU and Relay is Retrying" and a retry value (e.g., retry count and/or retry time). The DCReject/LMReject may be a message type "DCR Wait" or "Link Modification Wait." The U2U relay may send a DC Reject or a Link Modification Reject to the source WTRU with a code indicating the cause "Retry Unsuccessful," for example, if the PC5 link establishment between the U2U relay and the target WTRU may be unsuccessful. The Source WTRU may determine whether to wait or not to establish connectivity. The source end WTRU may receive a message indicating "Congestion Situation at target WTRU and retry." The source end WTRU may increase the retransmission time for the DCR or stop it (e.g., because the Relay handles the retries), for example, based on receiving the message. The source end WTRU may (e.g., alternatively) cancel (e.g., determine to cancel) the link establishment procedure via the relay, for example, by sending a Link Release Request or PC5-S message (e.g., DCCancel/LMCancel). The Relay receiving the message (e.g., Link Release Request or PC5-S message) may set its retry value (e.g., retry counter) to 0 and ignore a (e.g., any) reply from the target end WTRU related to the link establishment/link modification procedure.

Direct communication (e.g., ProSe Direct Communication) may be established.

Figure 2:
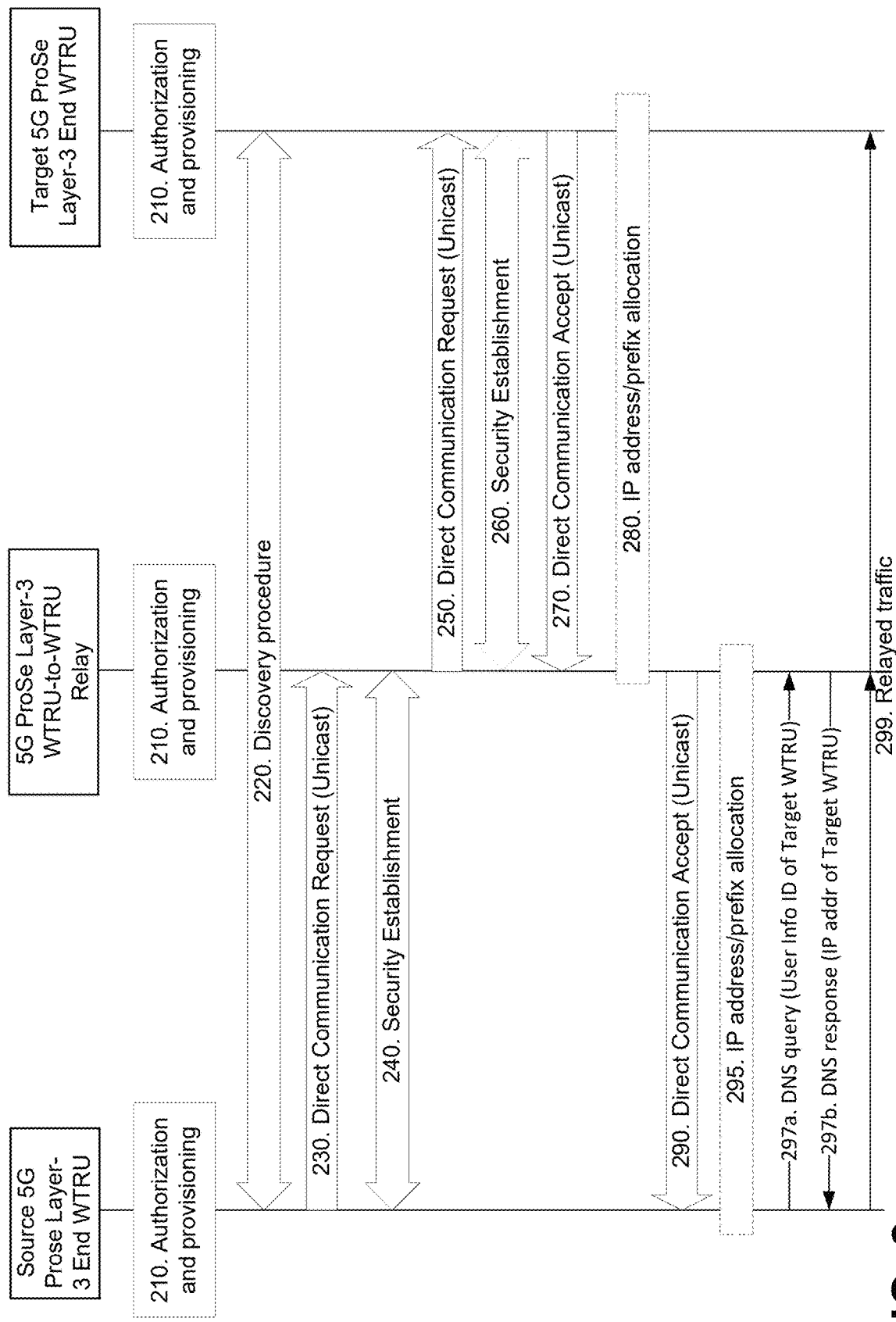
FIG. 2 illustrates an example ProSe communication via a ProSe Layer-3 WTRU-to-WTRU relay.
Figure 3:
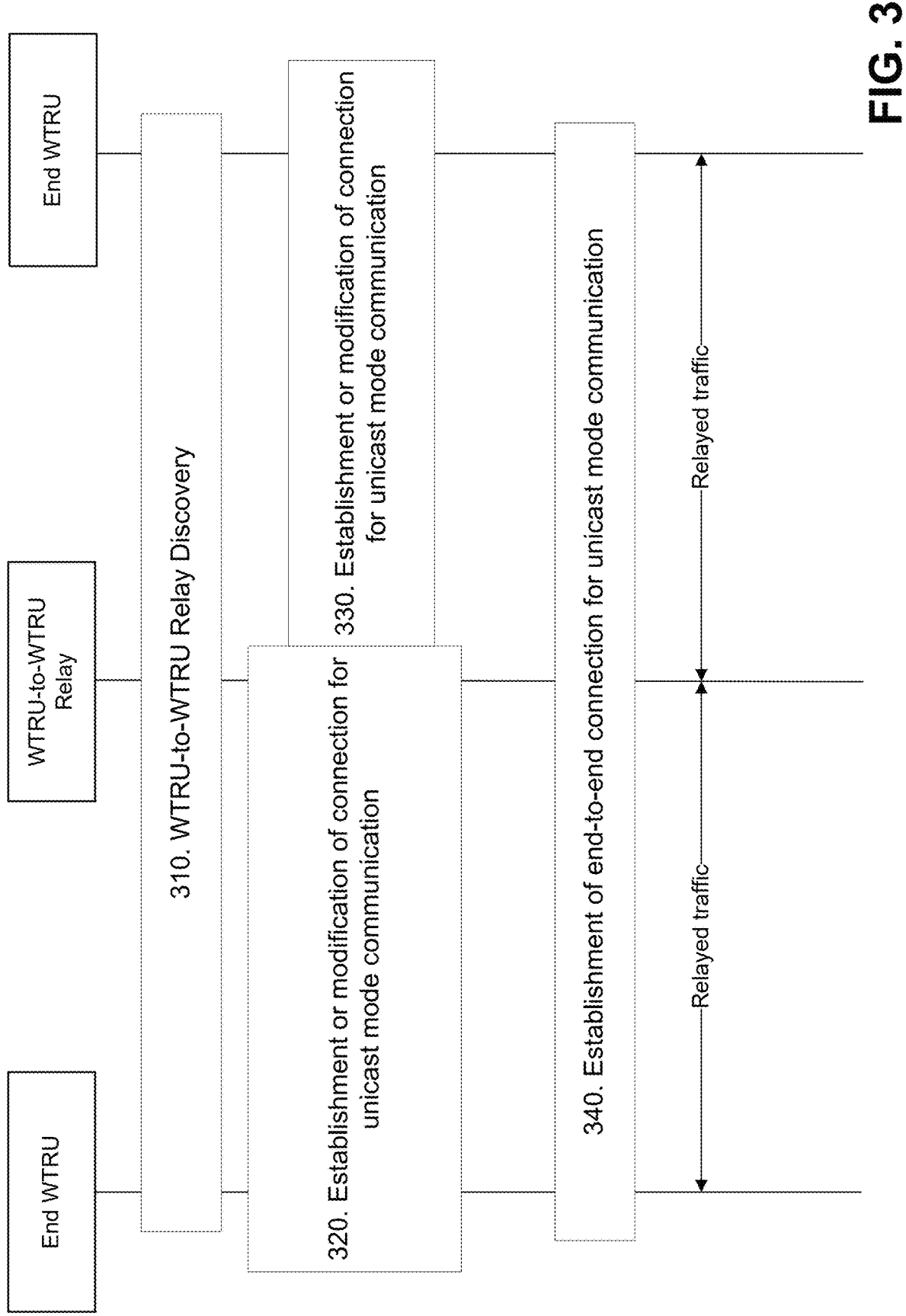
FIG. 3 illustrates example ProSe communication via an example ProSe layer-2 WTRU-to-WTRU Relay.

FIGS. 2 and 3 illustrate example procedures for communication (e.g., 5G ProSe communication) via a WTRU-to-WTRU (U2U) relay (e.g., 5G WTRU-to-WTRU relay). In examples, a source end-WTRU may discover a target WTRU. The target WTRU may establish connectivity with the U2U relay or may modify a link (e.g., existing link) with the U2U relay, for example, through a Direct Communication Request (DCR) or a Link Modification Request (LMR). The U2U relay may establish connectivity with the target end WTRU, for example, through a DCR or an LMR. The U2U relay may be associated with multiple (e.g., two) direct links (e.g., 5G ProSe direct links), for example, one with the source WTRU and the other with the target WTRU), for example, if (e.g., once) successful (e.g., during the course of the communication between the Source End WTRU and the Target WTRU).

FIG. 2 illustrates an example of ProSe communication via a ProSe Layer-3 WTRU-to-WTRU relay. FIG. 3 illustrates an example of ProSe communication via a ProSe Layer-2 WTRU-to-WTRU Relay.

The PC5 link between the source ProSe End WTRU and the ProSe WTRU-to-WTRU Relay may be shared for multiple target ProSe End WTRUs (e.g., in the case of one source ProSe End WTRU communicating with multiple target ProSe End WTRUs). The PC5 links may be established (e.g., individually) between the ProSe WTRU-to-WTRU Relay and target ProSe End WTRUs. The Layer-2 link modification procedure may be used, for example, for the shared PC5 link.

A message (e.g., PROSE DIRECT LINK ESTABLISHMENT REJECT/PROSE DIRECT LINK MODIFICATION REJECT message) may include an information element (e.g., PC5 signaling protocol cause information element (IE) set to a value (e.g., #13 congestion situation). This may occur in cases where the DCR or LMR fails. The rejection message may include a cause value (e.g., #13 congestion situation), for example, if (e.g., when) a DCR or LMR is rejected (e.g., through a PROSE DIRECT LINK ESTABLISHMENT REJECT/PROSE DIRECT LINK MODIFICATION REJECT message).

The Target WTRU may provide a back-off value (e.g., a timer value) to the initiating WTRU in a message (e.g., the PROSE DIRECT LINK ESTABLISHMENT REJECT message). The target WTRU may refrain from accepting a (e.g., any) ProSe direct link establishment request for relaying, for example, if the back-off value (e.g., via a timer) for NAS level mobility management congestion control is active (e.g., running).

The target WTRU may send a message (e.g., PROSE DIRECT LINK MODIFICATION REJECT message). The message may be sent via signaling. The message may indicate a cause value (e.g., with PC5 signaling protocol cause value #5 "lack of resources for 5G ProSe direct link"). The target WTRU may send a message (e.g., PROSE DIRECT LINK MODIFICATION REJECT message), for example, if the 5G ProSe direct link modification fails (e.g., due to congestion problems or other temporary lower layer problems causing resource constraints).

ProSe Direct Link Release may be performed and/or provided.

An (e.g., either) end WTRU of the communication may release a link. A request (e.g., PROSE DIRECT LINK RELEASE REQUEST) may include an IE value indicating the cause, e.g, #13 congestion situation. The end WTRU may trigger WTRU-to-Network relay reselection, for example, if the end WTRU of the communication releases a link. The end WTRU may trigger WTRU-to-network relay reselection, for example, if there is a request (e.g., PROSE DIRECT LINK RELEASE REQUEST or PROSE DIRECT LINK RELEASE REQUEST) with a cause IE value.

A source WTRU may establish connectivity to a target WTRU via a U2U relay. The U2U relay may forward a rejection back to the source WTRU, for example, if the target WTRU rejects the PC5 link establishment or modification. The source WTRU may choose whether to reestablish connectivity or reselect a U2U relay and/or a target WTRU.

The target WTRU may indicate the reason for the rejection (e.g., in the PC5 link establishment/modification reject message (#13, #5). The values may be ignored (e.g., may not be taken into consideration) if (e.g., when) handling reject messages (e.g., DCR/LMR) at the WTRU-to-WTRU relay or source WTRU. The WTRU-to-WTRU relay or source WTRU handling may be refrained from being described (e.g., not be described), for example, if a reject cause value (e.g., which may provide a backoff time (e.g., #5, #13)) is received at the WTRU-to-WTRU relay or source WTRU.

The U2U relay may assist in the handling of the reject messages to improve the overall performance, for example, if the reject message and its payload (e.g., cause IE values) are available to the U2U relay.

In scenarios where the target WTRU shares a (e.g., single) PC5 link towards the U2U relay, communicating with one or more source WTRUs may be taken into consideration. For example, scenarios where one or more target WTRUs communicate with the same source WTRU via the same U2U Relay (e.g., the PC5 link between the U2U Relay and the source WTRU is shared) may be taken into consideration.

Handling Direct Communication and Link Modification Reject messages may include one or more of the following scenarios: a U2U relay may attempt to re-establish connectivity on behalf of the Source WTRU; a U2U relay may inform the source WTRU about the reject message and the cause value received from the Target WTRU (e.g., while being immediately available for handling any other messages); a U2U relay may handle (e.g., all) incoming requests from multiple Source WTRUs; etc.

A relay may retry on behalf of the source end WTRU. A relay may retry, for example, based on (e.g., when) receiving a reject with a backoff time (e.g., timer), on behalf of the source End WTRU.

Figure 4:
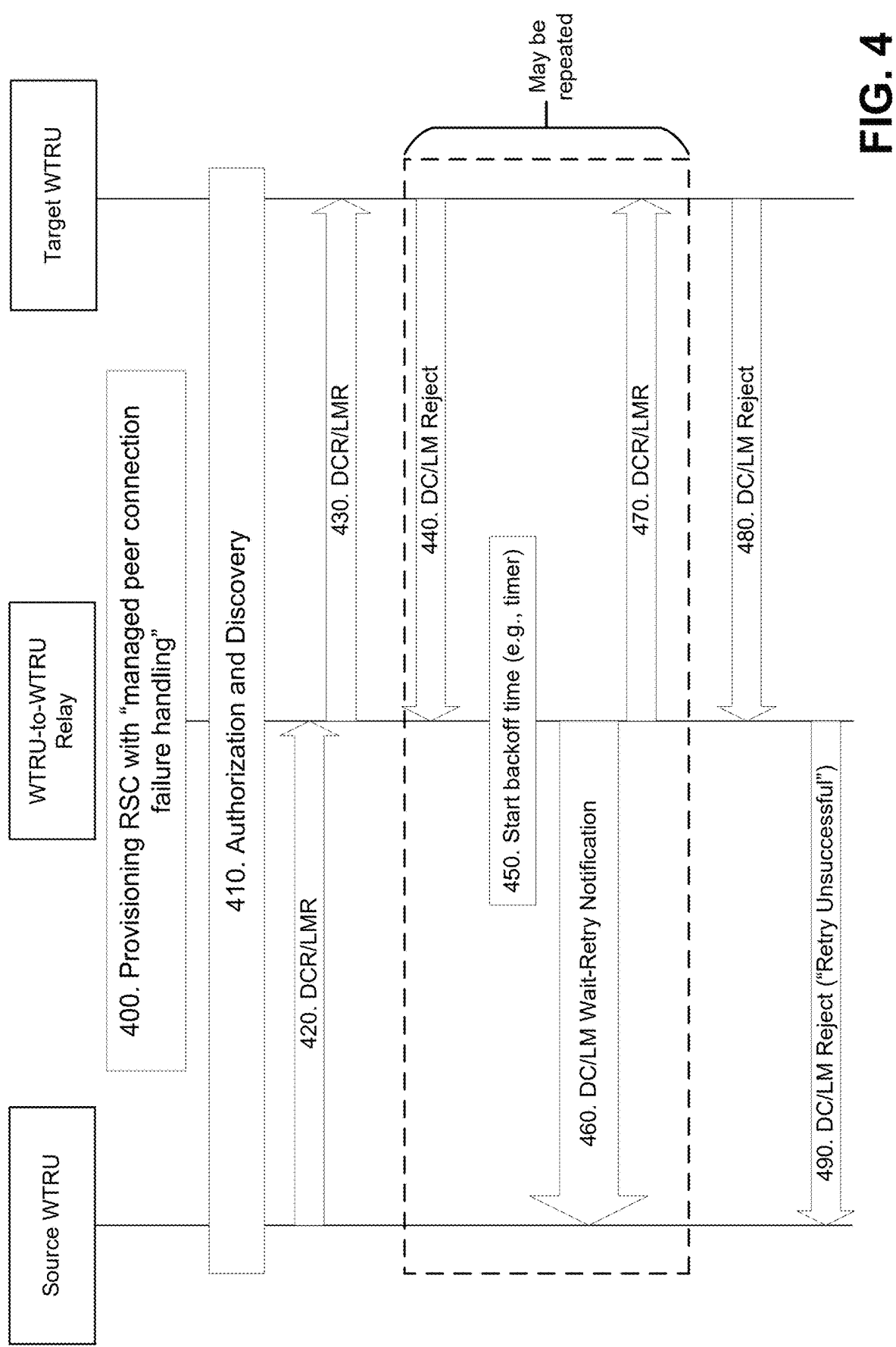
FIG. 4 illustrates an example flow that enables a U2U relay to handle DC/LM Reject messages and retry on behalf of the source WTRU.

FIG. 4 illustrates an example flow for enabling a U2U relay to handle DC/LM Reject messages and retry on behalf of the source WTRU. As shown in FIG. 4, the relay may retry based on (e.g., when) receiving a Reject with a backoff time (e.g., a timer) on behalf of a source End WTRU. One or more of the following may describe the actions as shown in FIG. 4 and other for example and optional procedures.

As shown at 400 in FIG. 4, a U2U Relay may be provisioned with a relay service code (RSC). The RSC may indicate its support for "managed peer connection failure handling".

As shown at 410 in FIG. 4, service authorization and provisioning may be performed for a source end WTRU (e.g., source ProSe End WTRU), a target end WTRU (e.g., ProSe End WTRU), and/or a WTRU-to-WTRU relay (e.g., ProSe WTRU-to-WTRU Relay). The source ProSe End WTRU may perform discovery of a ProSe WTRU-to-WTRU Relay. The End WTRUs and Relay may be provisioned with an RSC with an indication of support for "managed peer connection failure handling." For example, the U2U Relay may provide this RSC to manage the recovery of connection failure with the Target WTRU on behalf of the Source WTRU (e.g., in case of congestion at the Target WTRU).

As shown at 420 in FIG. 4, the source WTRU may decide whether to use an existing PC5 link towards the U2U relay WTRU. An LMR may be sent to the U2U relay, for example, if an existing PC5 link may be chosen. A DCR may be sent to the U2U relay (e.g., otherwise). The source WTRU may specify if the U2U relay may retry on behalf of the source WTRU, e.g., by including "managed failure by source WTRU" or "managed failure by Relay" and/or one or more of the following: the (e.g., maximum) number of retries the U2U relay may perform; the (e.g., maximum) time it may be willing to wait; etc. These values may be negotiated between the Source WTRU and Relay, for example, during PC5 link establishment/modification.

As shown at 430 in FIG. 4, the U2U relay may decide whether to use an existing PC5 link towards the Target WTRU. An LMR may be sent to the Target WTRU, for example, if an existing PC5 link is chosen. A DCR may be sent to the Target WTRU (e.g., otherwise).

As shown at 440 in FIG. 4, the target WTRU may respond with a DC reject or Link Modification Reject message with a cause code (e.g., #5 or #13) to the U2U relay. The target WTRU may respond with a back-off time (e.g., timer). The target WTRU may respond with a DC reject or LMR message with a cause code along with a back-off time to the U2U relay.

As shown at 450 in FIG. 4, the U2U Relay may start tracking a backoff time (e.g., via a backoff timer) locally, for example, if the Source WTRU indicated in the initial DCR/LMR that the U2U relay may retry to establish connectivity to the Target WTRU (e.g., at 420 in FIG. 4) or if the RSC is provisioned with support of "managed peer connection failure handling." Different U2U relays may choose to do different things, for example, based on the agreed failure management.

As shown at 460 in FIG. 4, the U2U Relay may send a message to the source End WTRU, for example, indicating one or more of the following: the received cause code from the target WTRU; that rejection may be from the target WTRU; indicating that Relay may be waiting and performing a number of retries (e.g., a specified number of retries) on behalf of the source WTRU; etc. The message may include (e.g., any of) a DC Accept, LM Accept, DC Reject, or LM Reject message types with a (e.g., new) code which may refer to the cause: "Congestion Situation at target WTRU and Relay is Retrying". The message may be a different (e.g., new) message type such as, for example, 'DC Wait', 'Link Modification Wait' or DC Ack.

A Source End WTRU receiving a message with "Congestion Situation and Relay is Retrying" may increase the retry time (e.g., timer) for the DCR/LMR or may stop tracking the time (e.g., because the Relay may handle the retries).

The Source End WTRU may (e.g., alternatively) decide to cancel the link establishment/modification (e.g., via the relay). For example, the source End WTRU may cancel the link by sending a link release request (e.g., ProSe Link Release Request) or a (e.g., new) PC5-S message (e.g., DCCancel/LMCancel). In this case, the Relay receiving this message may set a retry number (e.g., via a retry counter) to zero (0) and may ignore a (e.g., any) reply from the target End WTRU related to this link establishment or modification procedure.

This message (e.g., as shown at 460 in FIG. 4) may be used to notify the source WTRU periodically, for example, that the U2U relay is still retrying.

As shown at 470 in FIG. 4, the U2U relay WTRU may retransmit the DCR/LMR message to the Target WTRU at the end of a duration (e.g., timer expiration), for example, if (e.g., while) the number of retransmits is less than the number of retries performed so far and the time elapsed is less than the maximum time the Source WTRU is willing wait (e.g., if specified by the source WTRU). Actions at 440, 450, 460, and 470, as shown in FIG. 4, may be repeated (e.g., a number of times). The actions associated with 460 in FIG. 4 may be performed (e.g., only once) if (e.g., when) the first Reject message is received at the Relay. It may be understood by the source WTRU and the Relay (e.g., based on actions associated at 410 and 420) that the Relay may be handling the retransmissions and the process at 460 may be optional.

As shown at 480 in FIG. 4, the target WTRU may respond, for example, with a rejection message (e.g., DCReject/LMReject).

As shown at 490 in FIG. 4, the Relay may send a DC Reject or Link Modification Reject with a (e.g., new) code (e.g., which may refer to the cause "Retry Unsuccessful"), for example, if the (e.g., maximum) number of retries is reached. This message may indicate that "Maximum retry attempts have been made."

The Relay may send an acceptance message, such as, for example, DC Accept or LM Accept (e.g., with the cause IE set to "Retry Successful"), for example, if successful link establishment is performed.

In examples, (e.g., for example) the U2U Relay may use the DCA message to notify the source WTRU of a pending connection establishment/modification with the Target WTRU (e.g., with respect to 460 in FIG. 4). The U2U Relay may send to the Source WTRU an LMR message which may include an indication of successful completion of connection with Target WTRU. The U2U Relay may receive from the Source WTRU an LMA message confirming Source WTRU acceptance of connection/communication with the Target WTRU. The U2U Relay may (e.g., for example) send a Link Release request message indicating unsuccessful completion of connection with Target WTRU.

The Source End WTRU may associate the Reject message with the target End WTRU. The Relay may be available to reach other target WTRUs.

Figure 5:
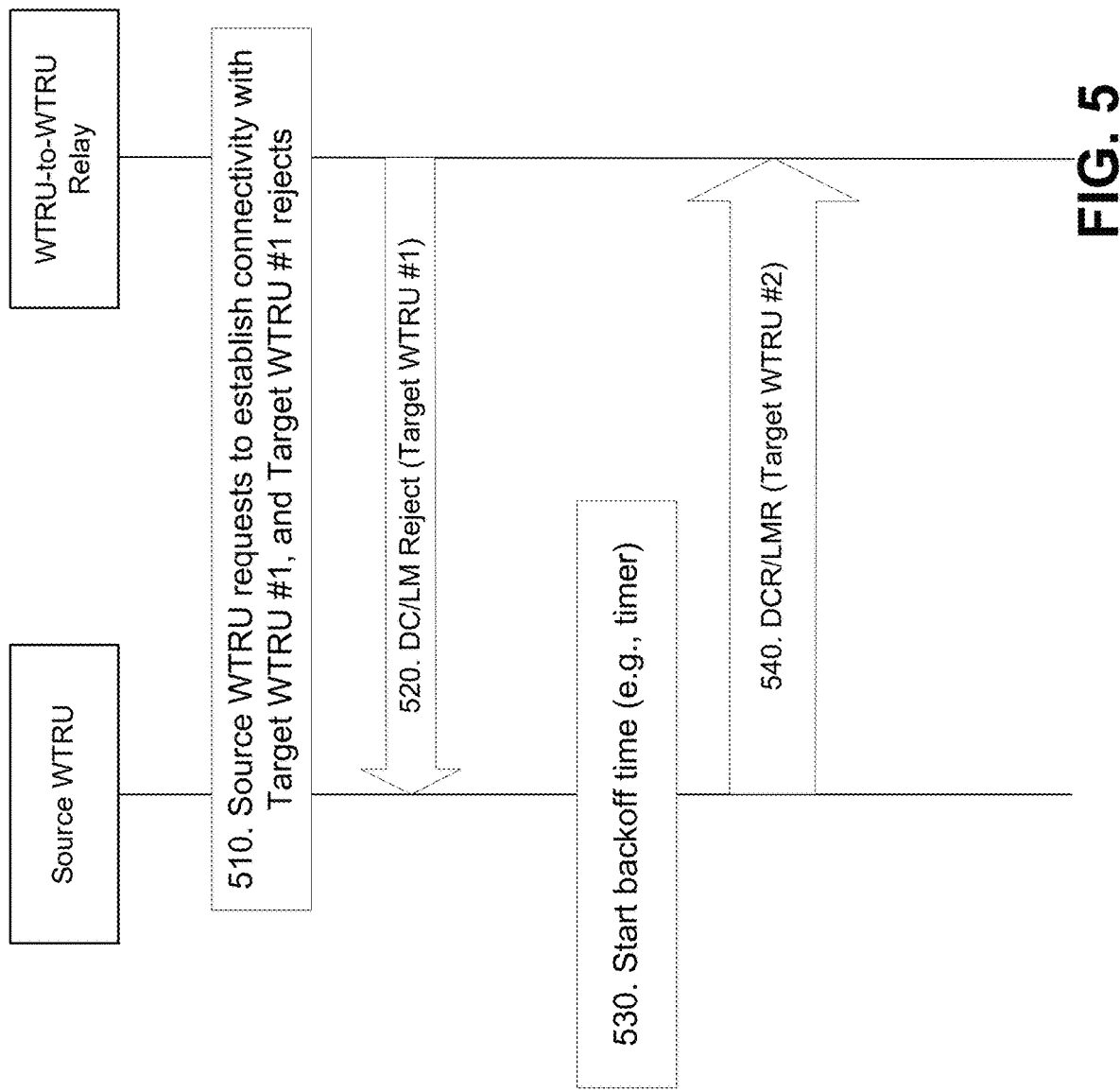
FIG. 5 illustrates an example flow of allowing a source WTRU to be notified of the target WTRU's request rejection and its cause.

FIG. 5 illustrates an example flow for allowing the source WTRU to be notified of the Target WTRU's request rejection and its cause. This message that notifies the source WTRU may allow the source WTRU to understand that the Reject originates from the Target WTRU. The reject may not originate from the U2U relay. The same U2U relay may be (re) used for reaching the same or a different Target WTRU. As shown in FIG. 5, the source End WTRU may associate the Reject message with the target End WTRU. The relay may be available to reach other target WTRUs.

As shown at 510 in FIG. 5, the Source WTRU may send a request to establish connectivity with Target WTRU #1 via the U2U relay. Then, the Target WTRU #1 may reject the request.

As shown at 520 in FIG. 5, the U2U Relay WTRU may reply to the Source WTRU with a DC/LM Reject message with a cause value. The (e.g., new) cause value may indicate that it may be the target End WTRU #1 that rejected the request. The message and cause values specified may refer to the target WTRU (e.g., may not refer to the U2U relay). It may indicate to Source WTRU that retries may not be handled by the U2U relay. This message may include the cause value the Target WTRU #1 sent to U2U Relay with its Reject message (e.g., security issue). The U2U relay may manage a time window to wait for multiple response messages, for example, in scenarios where the U2U relay sends a message to multiple target WTRUs. The U2U relay may send a consolidated Reject to the source WTRU, for example, at (e.g., after waiting until) the end of the time window.

As shown at 530 in FIG. 5, the source WTRU may start tracking a retry time (e.g., via a retry timer), for example, based on the received backoff value. The source WTRU may associate the retry time (e.g., timer) to the target End WTRU #1.

As shown at 540 in FIG. 5, the Source End WTRU may (re) select the (e.g., same) U2U Relay to reach the same (e.g., after the backoff timer) or other target End WTRUs (e.g., Target WTRU #2). This may be possible, for example, because (e.g., as now) the Source WTRU may be aware that the previous rejection came from the Target WTRU (e.g., not the U2U relay), and therefore the U2U relay may be available to handle other requests.

A relay may directly send a Reject to a second Source End WTRU, for example, if (e.g., when) a backoff time is being tracked (e.g., its backoff timer is running).

Figure 6:
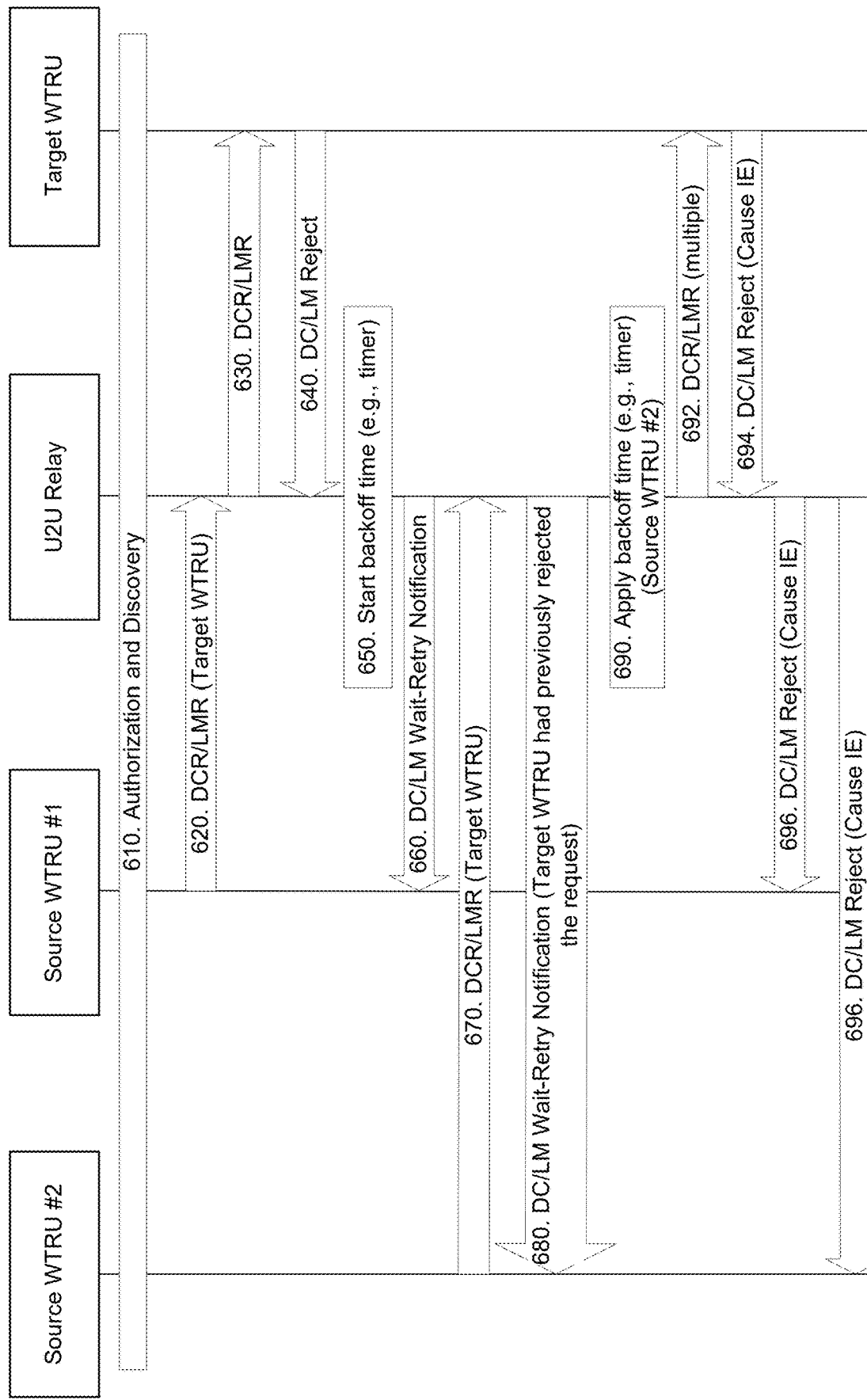
FIG. 6 illustrates an example flow that may allow a U2U relay to handle multiple requests to the same target WTRU if the target WTRU had previously rejected a request.

FIG. 6 illustrates an example flow that allows (e.g., enables) a U2U relay to handle multiple requests to the same Target WTRU (e.g., from more than one Source WTRU), for example, if (e.g., when) the target WTRU may have previously rejected a request. Scenarios may include where the target WTRU shares a link (e.g., a single PC5 link) with (e.g., towards) the U2U relay, for example, if (e.g., when) communicating with multiple source WTRUs.

As shown in FIG. 6, the Relay may (e.g., directly) send a Reject to a second Source End WTRU, for example, if (e.g., when) the backoff time is active or being tracked (e.g., its backoff timer is running).

As shown at 610 in FIG. 6, authorization and discovery may be performed (e.g., as described herein). As shown at 620 in FIG. 6, Source WTRU #1 may send a DCR/LMR to U2U relay (e.g., as described herein). As shown at 630 in FIG. 6, the U2U relay may send a DCR/LMR to the Target WTRU (e.g., as described herein). As shown at 640 in FIG. 6, the target WTRU may respond with a Reject message (e.g., as described herein). As shown at 650 in FIG. 6, the U2U relay may start tracking the backoff time (e.g., via the backoff timer), for example, as described herein.

As shown at 660 in FIG. 6, the U2U Relay WTRU may send a message to Source WTRU #1. The message may notify that the target WTRU has rejected the DCR/LMR with cause value and backoff time (e.g., timer). The Relay or the source WTRU may handle the retry procedure with the target WTRU. The Relay may keep track of rejection and the backoff time from the target WTRU. The Relay may keep track of the target WTRU's state, e.g., "reject" or "congested."

As shown at 670 in FIG. 6, the U2U relay may receive a DCR/LMR from a Source WTRU #2 for communication with the same Target End WTRU (e.g., which at 640 in FIG. 6 has returned a Reject message with a backoff time to the Relay).

As shown at 680 in FIG. 6, the U2U Relay WTRU may send (e.g., immediately send) a response message to the Source WTRU #2, for example, with the (e.g., new) cause value/message type (e.g., as described herein) to the Source WTRU #2 (e.g., in case the backoff time has not expired). This message may indicate that the Target End WTRU had previously rejected the request (e.g., through a (e.g., new) cause code). In examples, this indication may include the cause of the rejection indicated by the Target WTRU (e.g., congestion). This message may indicate that this message may be an immediate response, and the U2U relay has not attempted to establish connectivity, and it may retry once the current backoff time expires. It may specify the remaining time on the current backoff time. In examples, this message may be optional.

The Relay may (e.g., alternatively) use a backoff time associated with the target WTRU per the requesting source WTRU. In this case, the Relay may reply to the source WTRU #2, for example, without sending a request to the target WTRU, and start tracking the source WTRU #2 backoff time (e.g., via a timer).

As shown at 490 in FIG. 7, the U2U relay may keep track of (e.g., all) pending requests (e.g., and may associate them with the running backoff time) and may apply the running backoff time to the (e.g., all) received requests for the same Target WTRU (e.g., source WTRU #2's request), for example, if the U2U Relay handles the retries with the target WTRU.

As shown at 492 in FIG. 7, the backoff time may expire at the U2U Relay. The U2U relay may send (e.g., all) pending DCR/LMR requests from the (e.g., each) corresponding source WTRU to the target End WTRU, for example, if the U2U Relay handles the retries with the target WTRU. The Relay may (e.g., alternatively) handle backoff times per source WTRU and the (e.g., only the) pending request from the source WTRU associated with the expired backoff time may be sent to the target WTRU. The U2U relay may (e.g., alternatively) reset the state associated with the target WTRU to "normal" (e.g., at backoff time expiration), for example, if the U2U Relay is not handling the retries.

As shown at 494 in FIG. 7, the Target WTRU may send a reject message (e.g., DC/LM Reject with cause IE) to the U2U relay, for example, after the U2U relay sends a DCR/LMR (e.g., multiple DCR/LMR associated with the multiple pending source end WTRUs). The U2U relay may determine that a max number of retries has occurred.

As shown at 496 in FIG. 7, the Relay may send back a Reject message to the source End WTRU (e.g., both source end WTRUs, as shown in FIG. 6), for example, if the U2U Relay handles the retries with the target WTRU and if the U2U Relay receives a Reject message from the target End WTRU and the max retry has been reached. This message may indicate "Retry Unsuccessful". This message may also indicate "maximum retry attempts have been made." In case the retry was successful, this message may indicate "Retry Successful."

The target wireless transceiver unit (e.g., WTRU) may enable wait-retry responses (e.g., sent/received).

Wait-Retry responses may be applied to WTRU-to-WTRU communication scenarios.

A U2U relay may be used (e.g., as described herein), which may be applicable for direct WTRU-to-WTRU communication scenario where a relay has not been used. In such scenarios, the procedures of the U2U relay above may be applied to the Target WTRU.

For example, the target WTRU may refrain from accepting (e.g., not be able to accept) the DCR/LMR (e.g., now). The target WTRU may delay/accept the request later (e.g., the Target WTRU may predict the cause of the reject to resolve in the next few seconds). There may be no way for the Target WTRU to convey this to the relay or the source WTRU, for example, besides rejecting the request completely (e.g., all together).

The Target WTRU may refrain from rejecting (e.g., not directly Reject) the request. For example, the target WTRU may ask the requesting WTRU (e.g., a relay or another WTRU) to wait. The message may include a (e.g., new) code which may refer to the cause: "Wait-Retry Later" (e.g., as specified for U2U relay as described herein), and may indicate how long to wait.

The Source WTRU may delay (e.g., based on (e.g., upon) the reception) the starting of the back-off time, for example, until it receives a follow-up/update message from the Target WTRU or until the waiting period specified by the Target WTRU elapses. Otherwise, the source WTRU may stop waiting, and it may start the back-off time and retry with different (e.g., new) configurations (e.g., if any), if (e.g., once) the time expires, for example, if the source WTRU receives a message (e.g., DC/LM Reject) with cause IE "Retry".

A relay may receive a response to a DCR/LMR. The relay may delay the starting of the back-off time (e.g., until it receives a follow-up/update message from the Target WTRU or until the waiting period specified by the Target WTRU elapses), and the U2U relay may delay the sending of the DC/LM Reject message to the source WTRU, for example, if (e.g., when) a relay receives a response to a DCR/LMR with "the requesting WTRU wait and retry later" from the Target WTRU. The U2U Relay may (e.g., immediately respond) to a (e.g., new) DCR/LMR message received from other WTRUs indicating that "Target WTRU has requested to wait", for example, if (e.g., when) multiple Source WTRUs attempt to send DCR/LMR to the same Target WTRU. The U2U relay may receive a message (e.g., DC/LM Reject) with cause IE "Retry," for example, if the Target WTRU may (e.g., is able to) accept the request but prefers the connection to be reestablished. In this scenario, the U2U relay may start the back-off time and retry with a different (e.g., new) configuration (e.g., if any), for example, if (e.g., once) the time expires.

A relay (e.g., U2U relay) may retry, for example, if (e.g., when) it receives a reject message with a backoff time on behalf of the source end WTRU. The U2U relay may be provisioned with (e.g., receive configuration information indicating) an RSC. The RSC may indicate support for "managed peer connection failure handling." The U2U relay may receive a DCR or LMR from a source WTRU to establish connectivity via the relay. The request may specify whether the U2U may handle a congestion condition retry procedure, for example, on behalf of the source WTRU (e.g., by including "managed failure by source WTRU" or "managed failure by relay"). The U2U relay may send a DCR or LMR to a target WTRU. The U2U relay may receive a DC reject or link modification reject message from the target WTRU, for example, with a code (e.g., #5 or #13) and a backoff time. The U2U relay may send a message to the source WTRU, for example, indicating that it is waiting for the backoff interval and performing a number of retries on behalf of the source WTRU. For example, the U2U relay may send a DCReject/LMReject to the source end WTRU. The DCReject/LMReject may include a code (e.g., new code) that may indicate the cause "Congestion Situation at target WTRU and Relay is Retrying" and a retry value (e.g., retry count and/or retry time). The DCReject/LMReject may be a message type "DCR Wait" or "Link Modification Wait." The U2U relay may send a DC Reject or a Link Modification Reject to the source WTRU with a code indicating the cause "Retry Unsuccessful", for example, if the PC5 link establishment between the U2U relay and the target WTRU is unsuccessful). The Source WTRU may determine whether to wait or not to establish connectivity. The source end WTRU may receive a message indicating "Congestion Situation at target WTRU and retry". The source end WTRU may increase the retransmission time for the DCR or stop it (e.g., because the Relay handles the retries, for example, based on receiving the message. The source end WTRU may (e.g., alternatively) cancel (e.g., determine to cancel) the link establishment procedure via the relay, for example, by sending a Link Release Request or PC5-S message (e.g., DCCancel/LMCancel). The Relay receiving the message (e.g., Link Release Request or PC5-S message) may set its retry value (e.g., retry counter) to 0 and ignore a (e.g., any) reply from the target end WTRU related to the link establishment/link modification procedure. In examples, the source end WTRU may associate the reject message to the target end WTRU (e.g., the relay may be available to reach other target WTRUs). The source WTRU may send a DCR/LMR to establish connectivity with a target WTRU (e.g., via the relay). The source WTRU may receive a message from the U2U relay that may include a cause value indicating that the relay is performing a number of retries on behalf of the source WTRU (e.g., the cause value may not be applicable to the relay but may be applicable to the target end WTRU, e.g., DCR-Wait-Retry, LMR-Wait-Retry, DCReject, LMReject, etc.). The source WTRU may associate the rejection condition to the target end WTRU and refrain from associating the rejection condition to the U2U relay itself. The source WTRU may send a DCR/LMK to establish connectivity with another target WTRU, for example, via the relay (e.g., same relay) from which the DCReject/LMReject was received.

In examples, the relay may send (e.g., directly) a reject to a second source end WTRU, for example, if (e.g., when) the backoff time is being tracked (e.g., backoff timer is running). The U2U relay may receive a DCR/LMR from a second source WTRU, for example, for communicating with the (e.g., same) target end WTRU (e.g., which may have returned a reject with a backoff time to the relay). The U2U relay may handle the retry procedure with the second source WTRU. The U2U relay WTRU may track a backoff time. The backoff time may be associated with the target WTRU. While tracking the backoff time, the U2U relay WTRU may send (e.g., immediately send) a reject message (e.g., DCR-Wait-Retry, LMR-Wait-Retry, DCReject, LMReject, etc.) to the second source WTRU, for example, without trying to reach the target WTRU and with a cause value indicating that the "target end WTRU had previously rejected the request." The U2U relay may track the pending requests from the source WTRUs (e.g., associated it with the running/tracked backoff time). The U2U relay may apply the tracked backoff time to the requests to a (e.g., the same) target end WTRU. The U2U relay may send pending (e.g., all pending) DCR/LMR requests from the (e.g., each) corresponding source WTRU to the target end WTRU (e.g., if the backoff time expires and/or if the retry count is above 0). The relay may send back a reject message to (e.g., all) source end WTRUs waiting for a link establishment/modification response, for example, if the U2U relay receives a reject message from the target end WTRU and the max retry has been reached.

In examples, Wait-Retry responses may be sent/received (e.g., with or without a relay) at a target. For example, a target WTRU may receive a DCR/LMR to establish connectivity (e.g., via a relay or directly from a source WTRU). The target WTRU may send a DC/LM reject message with a cause indicating that "the requesting WTRU wait and retry later." The message (e.g., alternatively) may be a different (e.g., new) message type, for example, such as "DCR Wait" or "Link Modification Wait." The message may indicate how long the source WTRU and/or the U2U relay may wait for a response from the target WTRU, and/or before retrying, or triggering a WTRU reselection procedure. The U2U relay may receive a message indicating a cause that indicates that "the requesting WTRU wait and retry later." The U2U relay may delay starting the tracking of the back-off time, for example, until it receives a follow-up/update message from the target WTRU or until the waiting period specified by the target WTRU elapses. The U2U relay may delay the sending of the DC/LM reject message to the source WTRU. The U2U relay may respond (e.g., immediately) to a DCR/LMR message received from other WTRUs indicating that "Target WTRU has requested to wait." The U2U relay may receive a message (e.g., DC/LM reject) with the cause IE "Retry", for example, if the target WTRU may accept the request but prefers the connection to be reestablished (e.g., determined a condition associated with reestablishing a connection). In this case, the U2U relay may initiate tracking a back-off time and retry with a different configuration (e.g., if any), for example, once the time expires. The U2U may send a pending DCR/LMR message from the other source WTRUs to the target WTRU, for example, if (e.g., when) the time expires. The source WTRU may receive a message indicating a cause indicating that "the requesting WTRU wait and retry later" from the target WTRU. The source WTRU may delay the starting of tracking the back-off time, for example, until it receives a follow-up/update message from the target WTRU or until the waiting period specified by the target WTRU elapses. Otherwise, the source WTRU may start tracking the back-off time and retry with a different configuration (e.g., if any) if the time expires, for example, if the source WTRU receives a message (e.g., DC/LM Reject) with cause IE "Retry."

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A relay wireless transmit/receive unit (WTRU) comprising:
    a processor configured to:
        send, to a target WTRU, a direct communication request (DCR) transmission associated with a source WTRU;
        receive, from the target WTRU, a rejection message associated with the DCR transmission, wherein the rejection message indicates a congestion situation at the target WTRU and a back-off time;
        on condition that a maximum number of retransmissions associated with the DCR transmission has not been reached, send to the source WTRU a first message content, wherein the first message content indicates the congestion situation at the target WTRU and includes an indication of the back-off time; and
        on condition that the maximum number of retransmissions associated with the DCR transmission has been reached, send to the source WTRU a second message content, wherein the second message content indicates a rejection associated with the DCR transmission.

2. The relay WTRU of claim 1, wherein on condition that the maximum number of retransmissions associated with the DCR transmission has not been reached, the first message content further indicates that the relay WTRU will make retransmission attempts on behalf of the source WTRU.

3. The relay WTRU of claim 2, wherein on condition that the maximum number of retransmissions associated with the DCR transmission has not been reached, the first message content further indicates a number of retransmission attempts.

4. The relay WTRU of claim 1, wherein on condition that the maximum number of retransmissions associated with the DCR transmission has been reached, the second message content further indicates identification information associated with the target WTRU.

5. The relay WTRU of claim 1, wherein on condition that the maximum number of retransmissions associated with the DCR transmission has been reached, the second message content further indicates that the maximum number of retransmissions has been reached.

6. A method performed by a relay wireless transmit/receive unit (WTRU), the method comprising:
    sending, to a target WTRU, a direct communication request (DCR) transmission associated with a source WTRU;
    receiving, from the target WTRU, a rejection message associated with the DCR transmission, wherein the rejection message indicates a congestion situation at the target WTRU and a back-off time;
    on condition that a maximum number of retransmissions associated with the DCR transmission has not been reached, sending to the source WTRU a first message content, wherein the first message content indicates the congestion situation at the target WTRU and includes an indication of the back-off time; and
    on condition that the maximum number of retransmissions associated with the DCR transmission has been reached, sending to the source WTRU a second message content, wherein the second message content indicates a rejection associated with the DCR transmission.

7. The method of claim 6, wherein on condition that the maximum number of retransmissions associated with the DCR transmission has not been reached, the first message content further indicates that the relay WTRU will make retransmission attempts on behalf of the source WTRU.

8. The method of claim 7, wherein on condition that the maximum number of retransmissions associated with the DCR transmission has not been reached, the first message content further indicates a number of retransmission attempts.

9. The method of claim 6, wherein on condition that the maximum number of retransmissions associated with the DCR transmission has been reached, the second message content further indicates identification information associated with the target WTRU.

10. The method of claim 6, wherein on condition that the maximum number of retransmissions associated with the DCR transmission has been reached, the second message content further indicates that the maximum number of retransmissions has been reached.

\* \* \* \* \*